United States Patent [19]

Asakura

[11] Patent Number: 4,704,689
[45] Date of Patent: Nov. 3, 1987

[54] MACHINE TOOL FOR MACHINING A WORKPIECE BY FEEDING A CUTTING TOOL IN A SERIES OF DISCRETE STEPS AND RELATED METHOD

[75] Inventor: Koichi Asakura, Aichi, Japan

[73] Assignee: Brother Kogyo Kabushiki Kaisha, Aichi, Japan

[21] Appl. No.: 769,673

[22] Filed: Aug. 27, 1985

[30] Foreign Application Priority Data

Aug. 27, 1984 [JP] Japan ................ 59-177692
Sep. 7, 1984 [JP] Japan ................ 59-188572

[51] Int. Cl.$^4$ ............ G06F 15/46; B23B 47/34
[52] U.S. Cl. ............ 364/474; 364/475; 364/170; 318/571; 408/3; 408/11; 408/12; 408/17
[58] Field of Search ........ 364/167, 170, 474, 475; 318/561, 571; 409/80; 408/3, 8, 10-13, 17

[56] References Cited

U.S. PATENT DOCUMENTS

| 3,342,087 | 9/1967 | Mulot | 408/17 |
| 3,451,293 | 6/1969 | Takezawa | 408/17 |
| 3,634,664 | 1/1972 | Valek | 364/474 |
| 3,784,798 | 1/1974 | Beadle et al. | 364/475 |
| 3,873,816 | 3/1975 | Takeyama et al. | 364/474 |
| 4,025,764 | 5/1977 | Tack | 364/474 |
| 4,157,231 | 6/1979 | Phillips | 364/475 |
| 4,208,718 | 6/1980 | Chung | 409/80 |
| 4,346,444 | 8/1982 | Schneider et al. | 364/475 |
| 4,513,381 | 4/1985 | Houser, Jr. et al. | 364/475 |
| 4,597,040 | 6/1986 | Buzies | 364/474 |
| 4,624,607 | 11/1986 | Kato | 403/17 |

FOREIGN PATENT DOCUMENTS 223508 12/1983 Japan .
1537840 6/1975 United Kingdom .
1588058 12/1977 United Kingdom .

Primary Examiner—Jerry Smith
Assistant Examiner—John R. Lastova
Attorney, Agent, or Firm—Finnegan, Henderson, Farabow, Garrett and Dunner

[57] ABSTRACT

A machine tool for machining a workpiece by feeding a cutting tool into the workpiece in a series of discrete steps wherein a constant value is stored for each of those steps, a calculation is performed responsive to the value of a variable factor affecting operation of the cutting tool, such as cutting tool diameter and/or workpiece material coefficient, to calculate for each of the discrete steps a feed value as a function of the corresponding constant value for that step and as a function of the value of that factor. Control means is provided for feeding the cutting tool into the workpiece as a function of the feed values thus calculated for a plurality of steps. Upon completion of feeding for any one step, the cutting tool is at least partially withdrawn from the workpiece and the cutting tool is subsequently feed into the workpiece as a function of the feed value of the next step.

17 Claims, 19 Drawing Figures

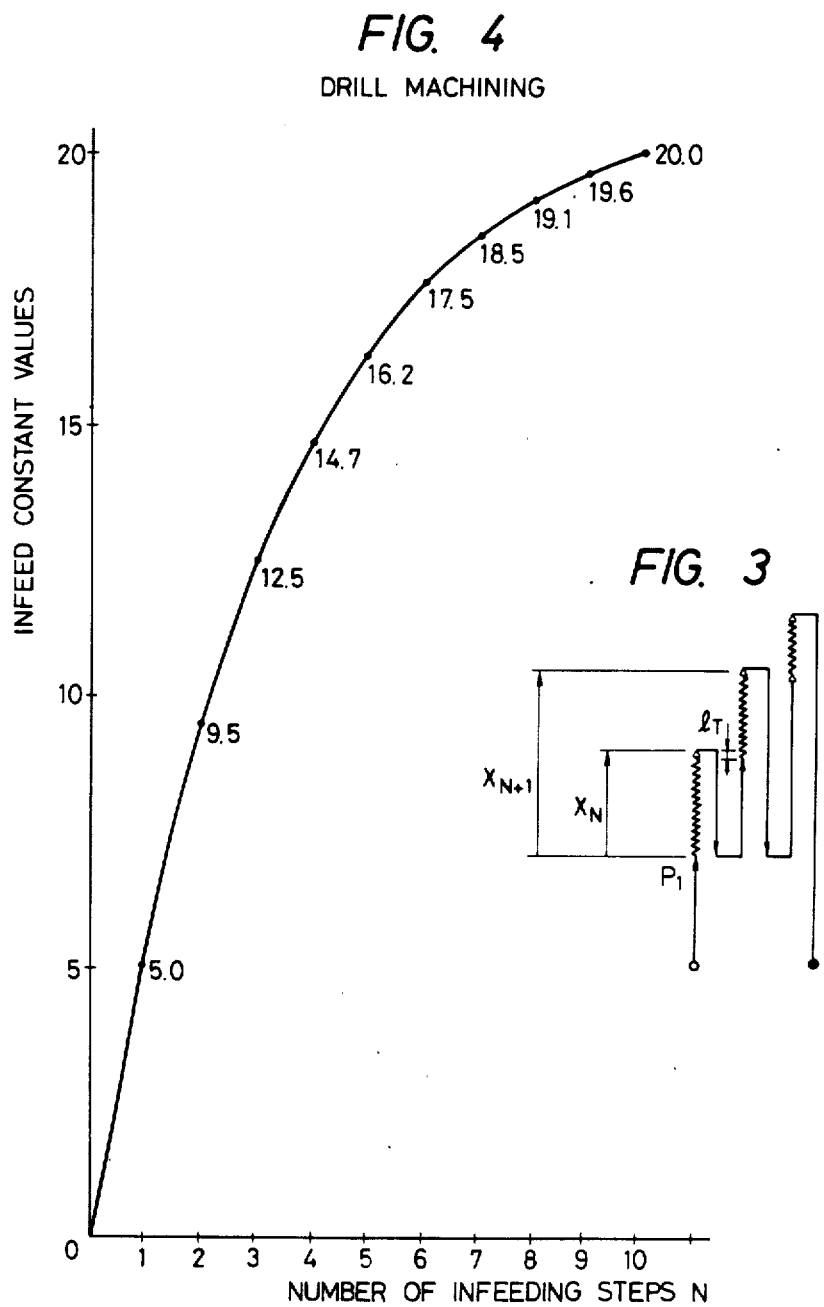

TAPPING OPERATION

| COEFFICIENT WITH RESPECT TO MATERIAL ||
|---|---|
| MATERIAL | COEFFICIENT |
| CARBON STEEL FOR MACHINE S45C | 1.0 |
| ALUMINUM Al | 2.0 |
| CAST IRON FC | 1.5 |
| STAINLESS STEEL SUS | 0.85 |

FIG. 17

```
<PROGRAM    1 φ φ φ >
 • MACHINING    ■ X         ?              MACHINING DATA
   ORIGINAL
 • WORK         1
   NUMBER
 ■ WORK                     ■ Y                    ?
 { MATERIAL
 TURN ON & OFF

WORK
MATERIAL ==>
                    5
                    6
 1   S 45 C         7    SPECIAL MATERIAL 1
 2   S C M          8    SPECIAL MATERIAL 2
 3   F C            9    SPECIAL MATERIAL 3
 4   A L           1 φ   SPECIAL MATERIAL 4
```

FIG. 18

```
<PROGRAM  1 φφφ>                      MACHINING DATA
 • MACHINING   ■X      ?       ■Y           ?
   ORIGINAL
 • WORK        1
   NUMBER
 • WORK        S45C
   MATERIAL
 ■ PROCESS φ 1
 TURN ON & OFF

PROCESS ==> _

1 CENTER HOLE  7              5 TAP WITH SEAT      11 PROGRAM STOP
  2 HOLE         8              6 UPPER SURFACE      12 SUB-PROGRAM
  3 TAP          9                CUTTING
  4 HOLE WITH 1φ                  REAMER             13 PROGRAM-TERMINATION
    SEAT                          COOLANT
                                  X Y TRAVEL
                                  EXTERNAL SIGNAL OUTPUT
```

FIG. 19

```
<PROGRAM  1 φ φ >
• MACHINING   ■ X  ?        ■ Y  ?         MACHINING DATA
  ORIGINAL
• WORK         1
  NUMBER
• WORK        FC
  MATERIAL
■ PROCESS  φ 1 HOLE
  TURN ON & OFF

HOLE
DIAMETER  = = >    316a
```

316

4,704,689

MACHINE TOOL FOR MACHINING A WORKPIECE BY FEEDING A CUTTING TOOL IN A SERIES OF DISCRETE STEPS AND RELATED METHOD

BACKGROUND OF THE INVENTION

I. Field of the Invention

The present invention relates to a machine tool for machining a workpiece by feeding a cutting tool into that workpiece in a series of discrete steps and related method.

II. Background Information

In general, in a machine tool drilling operation, a cutting tool is feed into a workpiece in a series of discrete steps. During each step of feeding the cutting tool into the workpiece, chips of workpiece material are removed. At the end of each of the steps, the cutting tool is at least partially withdrawn from the workpiece to cool the cutting tool with cutting oil.

It becomes more difficult to eject or remove chips as the cutting tool is feed deeper and deeper into the workpiece. Moreover, as the cutting tool penetrates into the workpiece, it is more difficult for the cutting oil to reach the cutting tool. Accordingly, as the cutting tool is fed into the workpiece, the rate of feeding of the cutting tool into the workpiece should be gradually decreased.

The prior art recognizes the need to reduce the rate of cutting tool feeding as that feeding progresses into the workpiece. For example, in Japanese patent application Laid-Open No. 223508/1983, the first discrete step of feeding a cutting tool into a workpiece or at least the first several such steps feed the cutting tool into the workpiece a predetermined distance each step. Thereafter, the distance the cutting tool is feed into the workpiece each subsequent step is reduced in a geometric ratio. However, this method of reducing the rate of feeding a cutting tool into a workpiece has several disadvatages. First, special knowledge is required to establish the predetermined feed distance for the first several steps. Second, since the cutting tool is fed into the workpiece a distance which varies as a function of overall feeding depth, when a large diameter cutting tool is employed that has a high strength, the number of discrete steps required to complete an operation is greater than the minimum number of steps ideally needed for that particular cutting tool.

Accordingly, work efficiency is lower than optimum.

SUMMARY OF THE INVENTION

An object of the subject invention is to provide a machine tool and related method which efficiently provides for feeding a cutting tool into a workpiece in a series of discrete steps.

Additional objects and advantages of the invention will be set forth in the description which follows and in part will be obvious from that description or may be learned by practice of the invention.

To achieve the foregoing object, and in accordance with the purposes of the invention as embodied and broadly described herein, a machine tool for machining a workpiece by feeding a cutting tool into that workpiece in a series of discrete steps is provided which comprises (a) data storage means for storing a constant value for each of those steps; (b) calculating means, responsive to the value of a variable factor effecting operation of the cutting tool, for calculating for each of the discrete steps a feed value as a function of the corresponding constant value for that step and the value of the variable factor effecting operation of the cutting tool; and (c) control means for feeding the cutting tool into the workpiece as a function of the feed value for a plurality of steps and, upon completion of feeding for one step, at least partially withdrawing the cutting tool and subsequently feeding the cutting tool into the workpiece as a function of the feed value for the next step. The variable factor effecting operation of the cutting tool is preferably either the cutting tool diameter or the workpiece material coefficient.

In the case of cutting tool diameter being the variable factor, the feed value is calculated as a function of both the cutting tool diameter and the corresponding constant value for that step. In the case of workpiece material coefficient being the variable factor, the feed value is calculated as a function of the workpiece material coefficient and the corresponding constant value for that step.

In a more limiting sense, the storage means is operable for storing a first constant value for each step and a second constant value (workpiece material coefficient) for each different type of workpiece material. In this embodiment, the calculating means calculates for each of the discrete steps a feed value as a function of the cutting tool diameter, first constant value for that step, and second constant value for that workpiece material.

Corresponding methods are also provided.

BRIEF DESCRIPTION OF THE DRAWINGS

FIG. 3 is a graphic representation of the movement of the drill cutting tool in accordance with the teachings of the subject invention;

FIG. 4 is graphical representation of constant values used in accordance with the teachings of the subject invention for a drilling operation;

FIGS. 13-19 disclose various entries which may appear on the screen of the control terminal disclosed in FIG. 12 in order to input information utilized in accordance with the teachings of the subject invention.

DESCRIPTION OF THE PREFERRED EMBODIMENT

Reference will now be made in detail to the present preferred embodiment of the invention as illustrated in the accompanying drawings.

Figure 1:
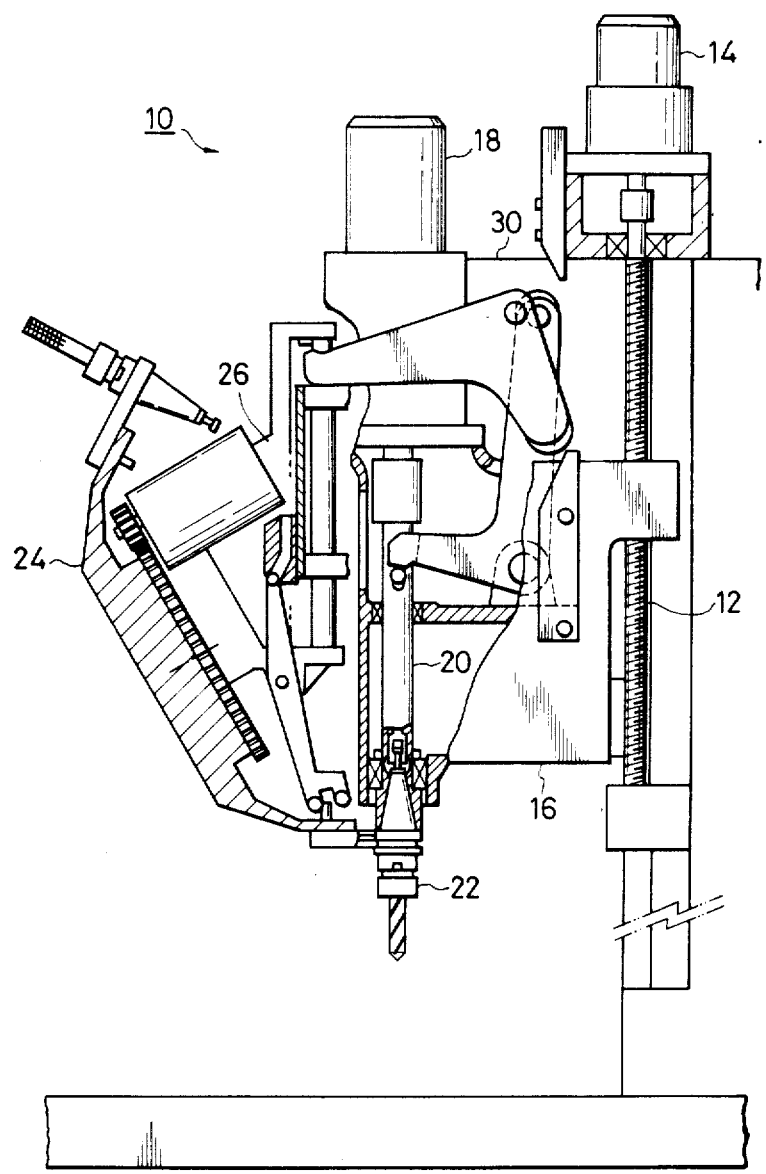
FIG. 1 is a sectional view showing the construction of a machine tool which may be utilized in accordance with the teachings of the subject invention.

FIG. 1 shows a side sectional view of a machine tool 10 which may be utilized to implement the teachings of the subject invention. Machine tool 10 is preferably provided with an automatic tool exchanging device which includes a feed screw 12 which is rotated by a feed motor 14. A spindle head 16 is coupled to be reciprocally moved in a vertical direction by operation of feed screw 12. A spindle motor 18 is mounted on spindle head 16. Spindle motor 18 drives a spindle 20. Spindle 20 in turn is designed to receive a cutting tool such as drill 22 which in turn is driven by spindle motor 18 as is well known to those skilled in the art. A tool magazine 24 is supported on a tool supporting stand 26 in such a manner that magazine 24 can be rotationally indexed. Tool supporting stand 26 is also supported in a manner which permits movement along the axial direction of spindle 20.

Figure 2:
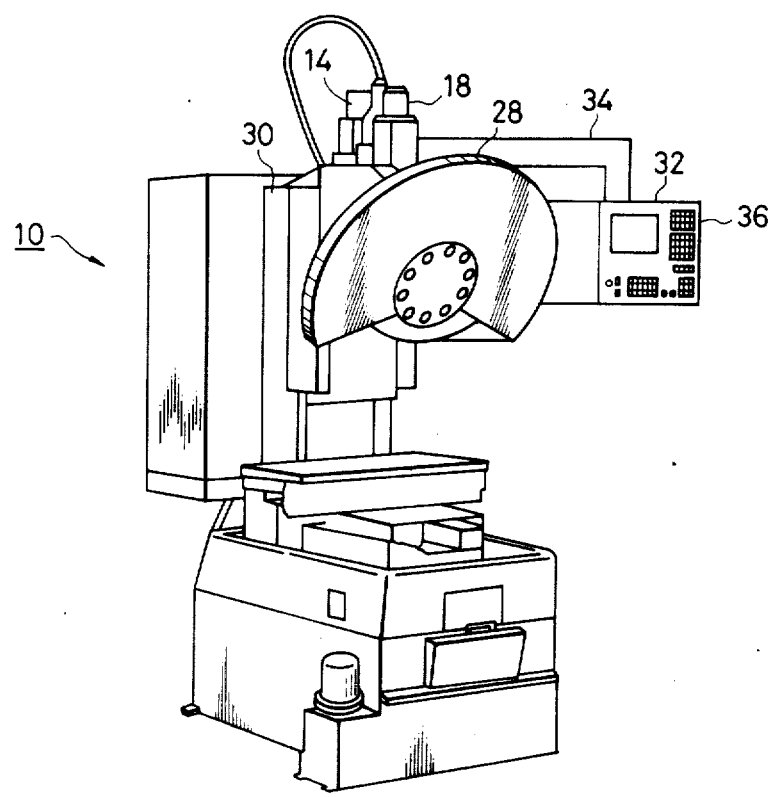
FIG. 2 is a perspective view showing the external appearance of the machine tool of FIG. 1.

In FIG. 2, a cover 28 is positioned over tool magazine 24. Machine tool 10 further includes a frame 30 to which a computer 32 may be attached by means of a supporting arm 34. Computer 32 includes a keyboard 36 and a random access memory (RAM), a read only memory (ROM) and a central processing unit (CPU) whose functions will be described below.

Conventionally, machine tool 10 may be operated to cut a hole in a workpiece through utilization of a cutting tool such as drill 22. This cutting process may occur, as shown in FIG. 3, in a series of incremental steps. At the end of each step N, the cutting tool, such as drill 22, has entered into a workpiece (not shown) a distance $X_N$. After completion of that step the cutting tool is at least partially withdrawn to permit cutting oil to reach the cutting edge of the cutting tool. Subsequently, in the next incremental step the cutting tool is fed a new distance $X_{N+1}$, where $X_{N+1}$ is greater than $X_N$, into the workpiece. This process of incrementally feeding the cutting tool into the workpiece continues until the desired cutting distance has been achieved.

The subject invention is based upon the realization that cutting tool diameter D should have an effect on the distance $X_N$ of each infeed into a workpiece, since the larger the cutting tool diameter, the more efficient the cutting operation and the more deeply an infeed may proceed for any particular step N of the stepping operation. In addition, it was realized that the ratio between the infeed distance $X_N$ for any given step N and the drilled diameter D is in a particular proportion to obtain the most efficient infeed distance $X_N$ irrespective of the drill diameter D for a particular type workpiece material. Thus, although the ratio of $X_N$ to D decreases gradually as the number of steps N increases, the ratio $X_N$ to D forms a saturation curve which may be utilized in connection with any particular drill diameter D to select the ideal infeed distance $X_N$ for any particular infeed step N. In addition, it has been found that this relationship of infeed distance $X_N$ to cutting tool diameter D is effective for both drilling cutting tools and tapping cutting tools.

Furthermore, it has been found that each workpiece may be given a workpiece material coefficient depending upon the material which makes up that workpiece. This workpiece coefficient may be determined irrespective of the diameter of the cutting tool employed. Moreover, this workpiece material coefficient may be utilized in computer 32 to vary the distance $X_N$ for any particular step of the cutting process to idealize $X_N$ for that particular workpiece material. Ideally, $X_N$ may be calculated as a function of a constant value in the form of the ratio $X_N/D$ for step N times the diameter D of the cutting tool employed, times the workpiece material coefficient.

For example, with specific reference to FIG. 4, there are shown specific constant values (5.0, 9.5, 12.5, 14.7, 16.2, 17.5, 18.5, 19.1, 19.6, 20.0) for each of infeeding steps N=1 through 10. As noted above, each of these constant values may be considered to comprise the ratio of the ideal effective cutting length $X_N$ for a given cutting tool diameter D for each step N. Accordingly, by multiplying any one of the infeed tool diameter constant values illustrated in the graph of FIG. 4 by the cutting tool diameter, the idealized infeed cutting length $X_N$ for a particular step N may be obtained.

As noted above, the constant values illustrated in FIG. 4 pertain to a drill cutting tool. Comparable constant values are illustrated in FIG. 5 with regard to a tapping cutting tool.

Figure 5:
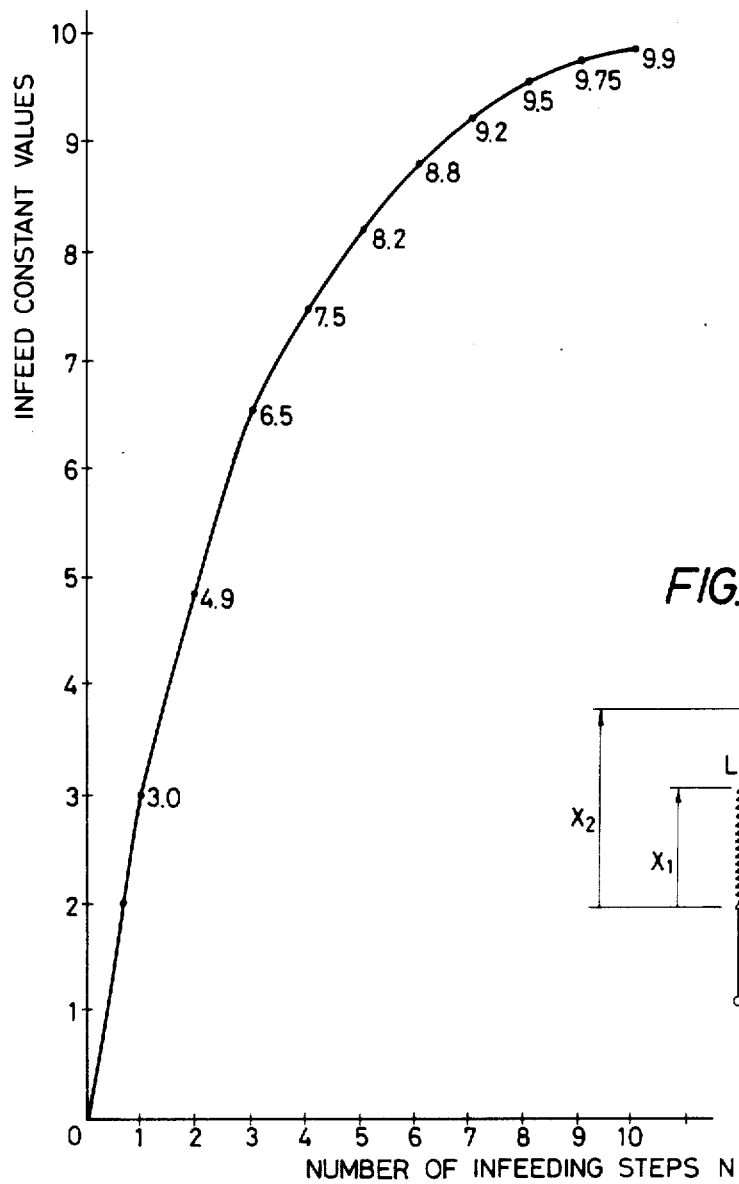
FIG. 5 is a graphical representation of constant values used in accordance with the teachings of the present invention in a tapping operation.
Figure 6:
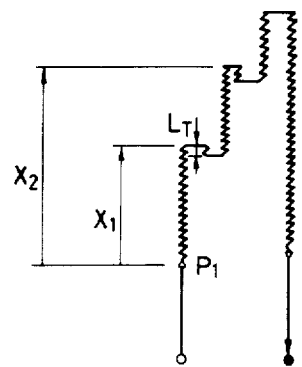
FIG. 6 is a graphic representation of the movements of a tapping cutting tool in accordance with the teachings of the subject invention.

FIGS. 3 and 6 illustrate the preferred movement of a cutting tool in accordance with utilization of the constant values disclosed in FIGS. 4 and 5, for a drill cutting tool and tap cutting tool, respectively. With regard to FIG. 3, a first infeed distance $X_N$ extends from a starting point $P_1$ into a workpiece. $X_N$ is calculated by multiplying drill cutting tool diameter times the indicated constant value (5.0 for step N=1). Subsequently, the drill cutting tool is at least partially withdrawn from the workpiece. As illustrated in FIG. 3, the drilling cutting tool may be completely removed from the workpiece. Thereafter, the drilling cutting tool is reinserted into the workpiece a distance $X_{N+1}$ wherein this distance $X_{N+1}$ is calculated by multiplying the constant value (9.5 for step N+1=2) times the drill workpiece diameter. This process is continued until the desired depth of the cut in the workpiece has been reached.

In FIG. 6, comparable movement of a tapping cutting tool is disclosed. However, in FIG. 6 the cutting tool is disclosed as being only partially withdrawn from the workpiece after each step ends.

A further description of the operation required to achieve the movement of cutting tools illustrated in FIGS. 3 and 6 will be provided below.

As was referred to above, the workpiece material coefficient may also be employed to calculate the specific $X_N$ a cutting tool is to be inserted into a workpiece for any particular step N. In accordance with the preferred embodiment of the invention, distance $X_N$ may be determined by simply multiplying a constant value (such as those illustrated by the graphs of FIGS. 4 and 5) for any particular step N times the diameter D of the cutting tool employed, times the workpiece material coefficient (such as the coefficients illustrated for the work piece materials disclosed in FIG. 7).

The constant values of FIGS. 4 and 5 may be experimentally determined for a standard workpiece material, such as carbon steel S45C and the workpiece material coefficient for carbon steel S45C may be set to 1.0. The workpiece coefficient for softer workpiece materials will, therefore, be greater than 1.0 and the workpiece coefficient for materials harder than carbon steel S45C will be less than 1.0. Although certain coefficients are disclosed in FIG. 7, the workpiece material coefficients utilized for any particular embodiment may be experimentally determined.

Figures 7, 8:
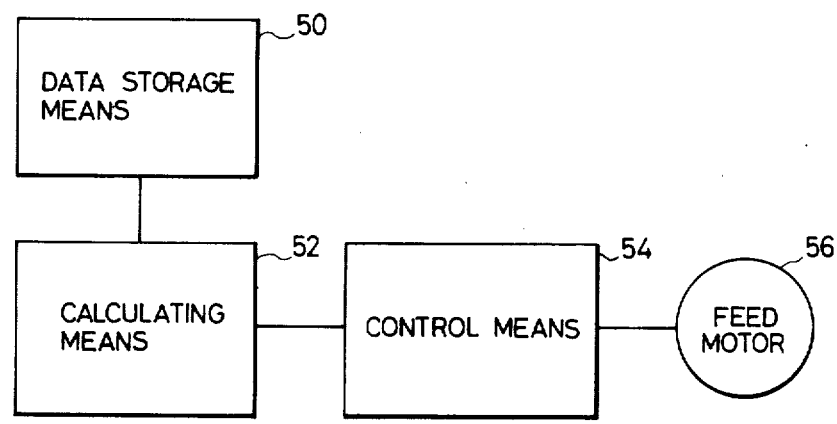
FIG. 7 is a chart showing workpiece material coefficients.
FIG. 8 is a block diagram disclosing a system incorporating the teaching of the subject invention.

FIG. 8 discloses a block diagram of the generic structure of a machine tool built in accordance with the teachings of the subject invention. As shown in FIG. 8 there is provided data storage means 50 which operates to store a constant value of each of a plurality of discrete cutting steps; calculating means 52 which is responsive to the value of a variable factor effecting operation of a cutting tool, such as cutting tool diameter or workpiece material coefficient, which operates to calculate for each of the discrete steps a feed value as a function of the corresponding constant value stored in data storage means 50 for that step and the value of the variable factor, such as cutting tool diameter or workpiece coefficient (or both). There is further illustrated in FIG. 8 control means 54 which operates for feeding a cutting tool into a workpiece as a function of the feed values determined by calculator means 52 for each of a plurality of steps N and which, upon completion of feeding for one step, at least partially withdraws the cutting tool with the workpiece and subsequently feeds the cutting tool into the workpiece as a function of the feed value of the next step. Actual movement of the cutting tool is accomplished by feed motor 56 under operation of control means 54.

Figure 9:
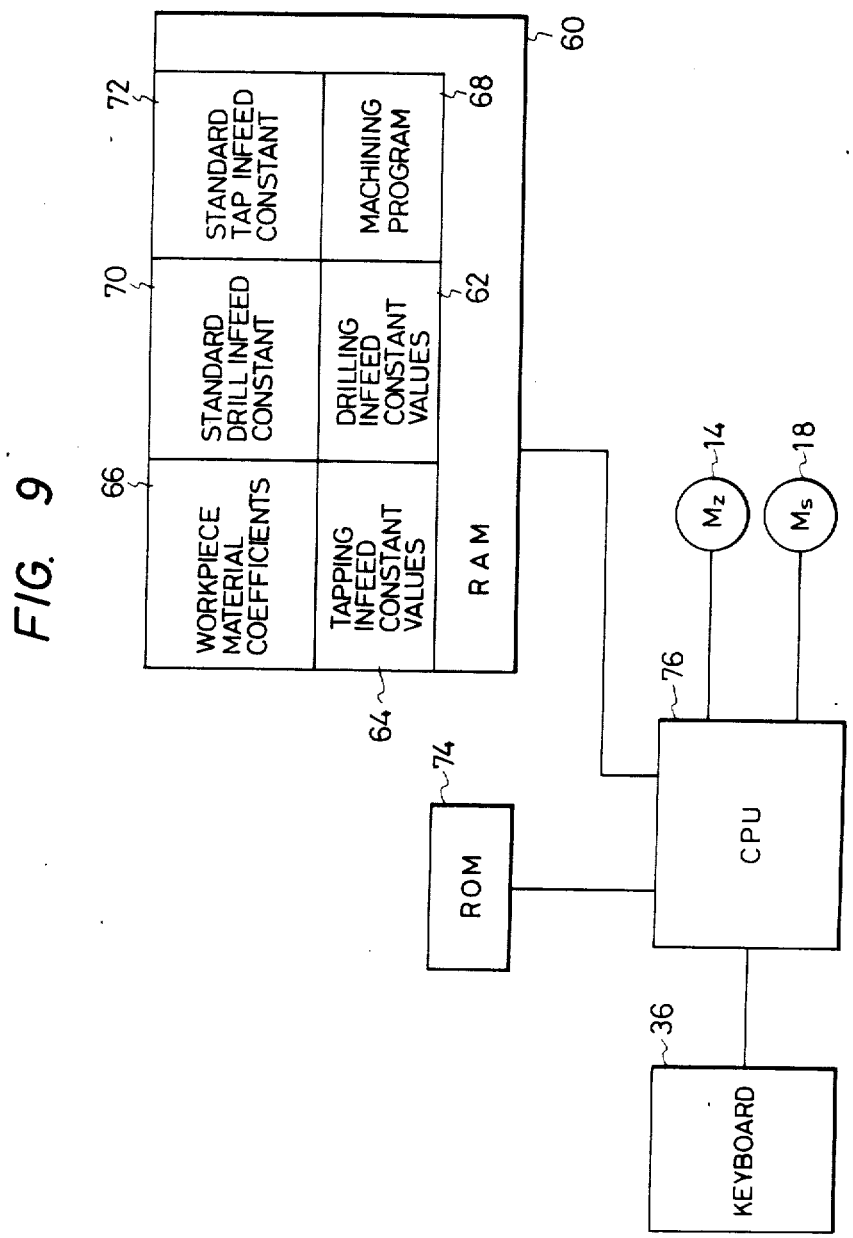
FIG. 9 is a block diagram showing a preferred embodiment of the subject invention.

FIG. 9 illustrates a specific preferred embodiment of the subject invention. In FIG. 9 there is illustrated a random access memory 60 which may operate to store a constant value for each step of a cutting operation. For example, when that cutting operation involves drilling, drilling infeed constant values such as those illustrated in FIG. 4 are stored in section 62 of RAM 60. When the cutting operation involves tapping, tapping infeed constant values of the type illustrated in FIG. 5 are stored in section 64 of RAM 60. In addition, workpiece material coefficients, such as those disclosed in FIG. 7, are stored in section 66 of RAM 60. A machining program is stored in section 68, a standard drill infeed constant is stored in section 70 and a standard tap feed constant is stored in section 72. The function of the standard drill and tap infeed constants will be described below.

The machining program stored in section 68 of random access memory 60 may be inputted through operation of keyboard 36 of computer 32 illustrated in FIG. 2. In order to edit a machining program, keyboard 36 may be operated to alter or add a step of inputting drawing data such as tool or hole diameters, a step of determining a machining sequence, a step of changing tool patterns, a step of assigning and changing tools, a step of changing cutting conditions, a step of displaying, eliminating and arranging the amounts of capacity used and the amounts of capacity not used in programs and memories stored within RAM 60, and a step of transmitting data to and from internal program memories.

There is further illustrated in FIG. 9 a read only memory 74 which, as should be readily apparent to those skilled in the step feeding machine tooling art, is utilized in connection with the actual control of the positioning of a cutting tool.

FIG. 9 still further illustrates a central processing unit 76 of the FIG. 2 computer 32, keyboard 36 of computer 32, feed motor 14 as illustrated in FIGS. 1 and 2 and spindle motor 18 as is also illustrated in FIGS. 1 and 2.

Figure 10:
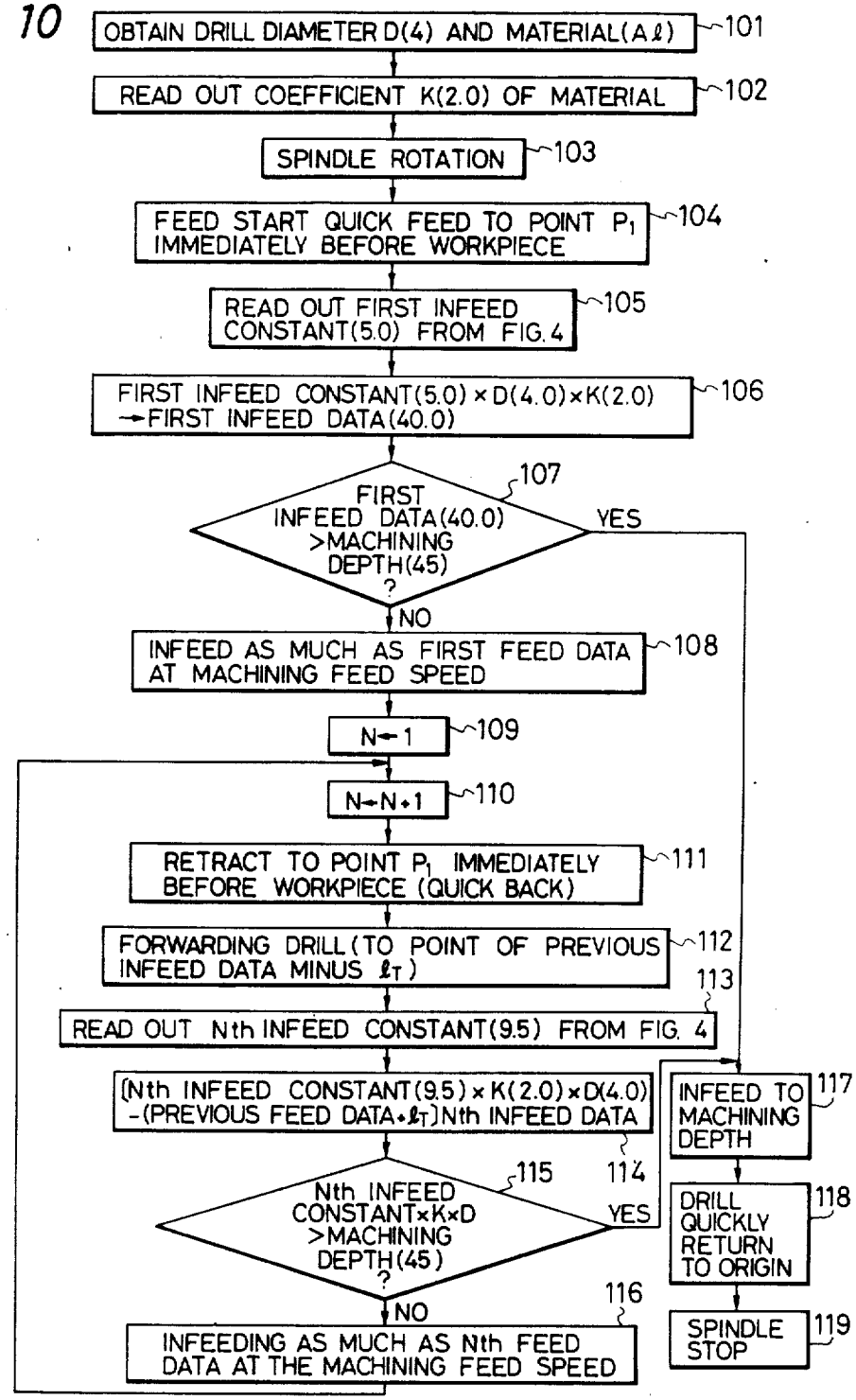
FIG. 10 is a flow diagram disclosing a drilling operation performed in accordance with the subject invention.
Figure 11:
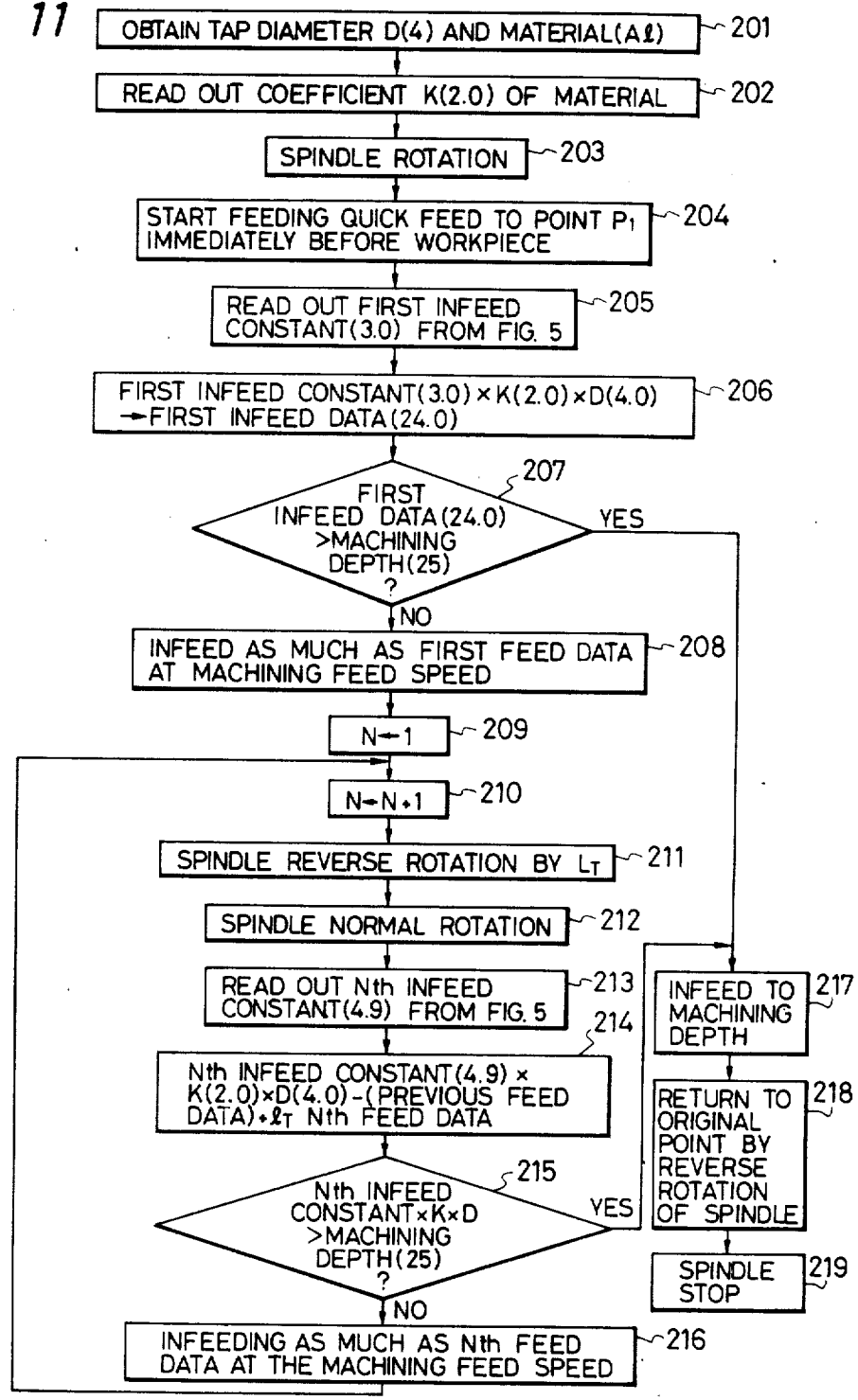
FIG. 11 is a flow diagram disclosing a tapping operation performed in accordance with the teachings of the subject invention.

An actual drilling operation in accordance with one embodiment of the subject invention may be carried out according to the flow chart illustrated in FIG. 10. The flow chart of FIG. 10 is specifically designed for a drilling cutting operation whereas the flow chart of FIG. 11 is specifically designed for a tapping cutting operation.

As shown in FIG. 10 an initial instruction 101 comprises the step of obtaining cutting tool diameter and workpiece material type. This data may be obtained through operation of keyboard 36 of computer 32 as will be described below in more detail. For purposes of example, an assumption may be made that a cutting tool diameter of four (4.0) mm was obtained as a result of instruction 101 and that aluminum was identified as the workpiece material.

In instruction 102, the workpiece material coefficient for aluminum is readout of section 66 of RAM 60. In the case of aluminum, as illustrated in FIG. 7, the coefficient 2.0 is thereby obtained.

During step 103, spindle motor 18 is turned on.

Instruction 104 begins the actual feeding operation to quickly locate the tip of the cutting tool at origin point $P_1$ of FIG. 3 immediately adjacent to the workpiece. This feeding is carried out through operation of feed motor 14 as should be apparent to one skilled in the art.

Instruction 105 requires reading out of the first infeed constant value $(X_N/D)$ for the first step $N=1$. As shown in FIG. 4, this value may be 5.0.

In instruction 106, a first feed value is obtained by multiplying the first infeed constant value (5.0) by the tool diameter (4.0 mm) and by the workpiece material coefficient (2.0) to obtain a first infeed value equal to 40.0 mm.

Branch instruction 107 determines whether or not the first feed value (40.0) is larger than the machining depth, for example, (85 mm). If the answer is "NO" then instruction 108 is executed. In response to instruction 108 infeeding is carried out a distance indicated by the first feed value (40.0 mm) at a machining feed speed. In instruction 109, the particular step being carried out is registered. In this example, N is registered as equalling 1.

In response to instruction 110, the number of steps is incremented by one so the next sequential step may be undertaken. In the illustrative example provided, N would therefore equal 2 as a result of the first completion of instruction 110.

In response to instruction 111 the cutting tool is quickly retracted from the workpiece to position $P_1$ immediately adjacent to the workpiece. At this point, cooling oil may be introduced to the cutting tool.

Instruction 112 operates to insert the drill quickly to the point of the previous infeed value (40.0 mm) minus a tolerance value $1_T$ which may, for example, equal 1.0 millimeters.

As a consequence of instruction 113, the infeed constant value for the next step $(N=2)$ is obtained from section 62 of random access memory 60. As illustrated in FIG. 4, this next constant value equals 9.5.

In step 114 a calculation is carried out to obtain the next step feed value. In this regard, the feed value for the N-th step is is obtained by multiplying the N-th step feed constant value of FIG. 4 (9.5 for $N=2$) by the FIG. 7 material coefficient (2.0 for aluminum) by the drilled diameter D (4.0). Accordingly, for the second step, using the illustrative values set forth above, the feed value for the second step $X_2$ equals $9.5 \times 2.0 \times 4.0 = 76$ mm. Moreover, since the cutting tool was already returned to the $X_1$ feed value minus 1.0 mm in instruction 112, instruction 114 operates to determine the additional incremental distance the cutting tool must travel, namely $X_{N+1} - X_N + 1_T$ (76 mm − 40 mm + 1.0 mm = 37 mm).

Branch instruction 115 determines whether the N-th step feed value $X_N$ is larger than the desired total machining depth. If a negative result is obtained, instruction 116 is carried out so that infeeding is performed as to that N-th step at the machining speed and the program operation is returned to instruction 110. In this case, instructions 110 through 115 are again executed.

If, however, instruction 115 results in a determination that the N-th feed value is larger than the feeding depth, then instruction 117 is executed. In this case, infeeding proceeds to the desired total machine depth in accordance with the operation of instruction 117. Subsequently, instruction 118 operates to return the cutting tool to an original position and instruction 119 operates to cease spindle rotation.

If the feed value for the first step is greater than the total machining depth, then the result of instruction 107 would be "yes", instructions 108 through 115 would be skipped, and instructions 117 through 119 would be executed with priority.

According to the above-described embodiment, even a person not skilled in drilling can change the infeed data into a most suitable value according to the drill diameter and/or workpiece material employed. Therefore, in the drilling operation, the number of feeding steps can be reduced to a suitable value. That is to say, drilling can be achieved with a high degree of efficiency.

It should be understood that although a preferred embodiment with regard to drilling has been described above, various modifications can be practiced. For example, although it is preferable that the variable factor of cutting tool diameter be employed, it is possible that the feed values may be calculated only in accordance with the workpiece material coefficient. In this regard, it is necessary that a standard drill infeed constant stored in section 70 of memory 60 be employed. In this event, the standard drill feed constant would in effect take the place of the cutting tool diameter which ordinarilly would have been inputted in the course of carrying out instruction 101. Accordingly, the first feed value obtained through execution of instruction 106 would equal the standard drill infeed constant times the first infeed constant (5.0) for the first step, times the workpiece material coefficient (2.0). Obviously, it is preferable that the standard infeed constant not be employed and that instead the actual cutting tool diameter be obtained and employed.

It is also possible to practice the subject invention without employing the workpiece material coefficient. In such an instance, the workpiece material coefficient may be assumed to be 1.0 and, therefore, may be effectively eliminated from any calculation of feed value. In this event, the feed value is simply a function of cutting tool diameter and the corresponding constant value as shown in FIG. 4 for the step being undertaken.

An alternative embodiment of the subject invention is disclosed in connection with the flow diagram of FIG. 11. In the flow diagram of FIG. 11, a tapping cutting operation is carried out as opposed to the drilling cutting operation of FIG. 10. The instructions employed in the tapping cutting operation are similar to those employed in the drilling cutting operation. In this regard, instructions 201 through 210 are identical to instructions 101 through 110. However, in instruction 211 the main spindle is turned in the opposite direction as the cutting direction so as not to deform the threads formed on the interior surface of the workpiece.

Moreover, in a tapping operation the quantity of chips ejected are relatively small. Accordingly, the tool is withdrawn from the workpiece only a small distance such as distance $1_T$ illustrated in FIG. 6. This withdrawal of the cutting tool a distance $1_T$ actually permits the cutting tool to remain inside the workpiece. Instruction 212 resumes normal rotation operation. In addition, instruction 218 requires return to an original point of origin by reversed rotation of the spindle. However, other than these differences, instructions 213 through 219 are essentially identical to instructions 113 through 119 of FIG. 10.

The embodiment of FIG. 11 is advantageous in that the feed values can be set to a most suitable value according to the tapped diameter used, and the number of feeding steps can be reduced to a suitable value, with the result that the tapping operation can be achieved quickly and efficiently.

As noted above with regard to a drill cutting operation, a tap cutting operation may be performed either with only a tap diameter variable and/or only a workpiece material coefficient variable. When only tapped diameter is variable, the workpiece material coefficient may be assumed to be 1.0. When only the workpiece material coefficient is variable, a standard tap infeed constant stored in section 72 of RAM 60 may be employed in place of the tap cutting tool diameter variable.

In summary, the subject invention pertains to a machine tool for machining a workpiece by feeding a cutting tool such as a drill or a tap into a workpiece in a series of discrete steps. The machine tool comprises a data storage mechanism for storing at least a first constant value for each of those steps. A calculating mechanism is employed which is responsive to the value of a variable factor effecting operation of the cutting tool, such as cutting tool diameter or workpiece material coefficient, for calculating for each of the discrete steps a feed value as a function of the corresponding constant for that value and the value of the variable factor, namely cutting tool diameter or workpiece material coefficient. Finally, a control mechanism is employed for feeding the cutting tool into the workpiece as a function of the feed values for a plurality of those steps and, upon completion of feeding for one step at least partially withdrawing the cutting tool and subsequently feeding the cutting tool into the workpiece as a function of the feed value of the next step.

Figure 12:
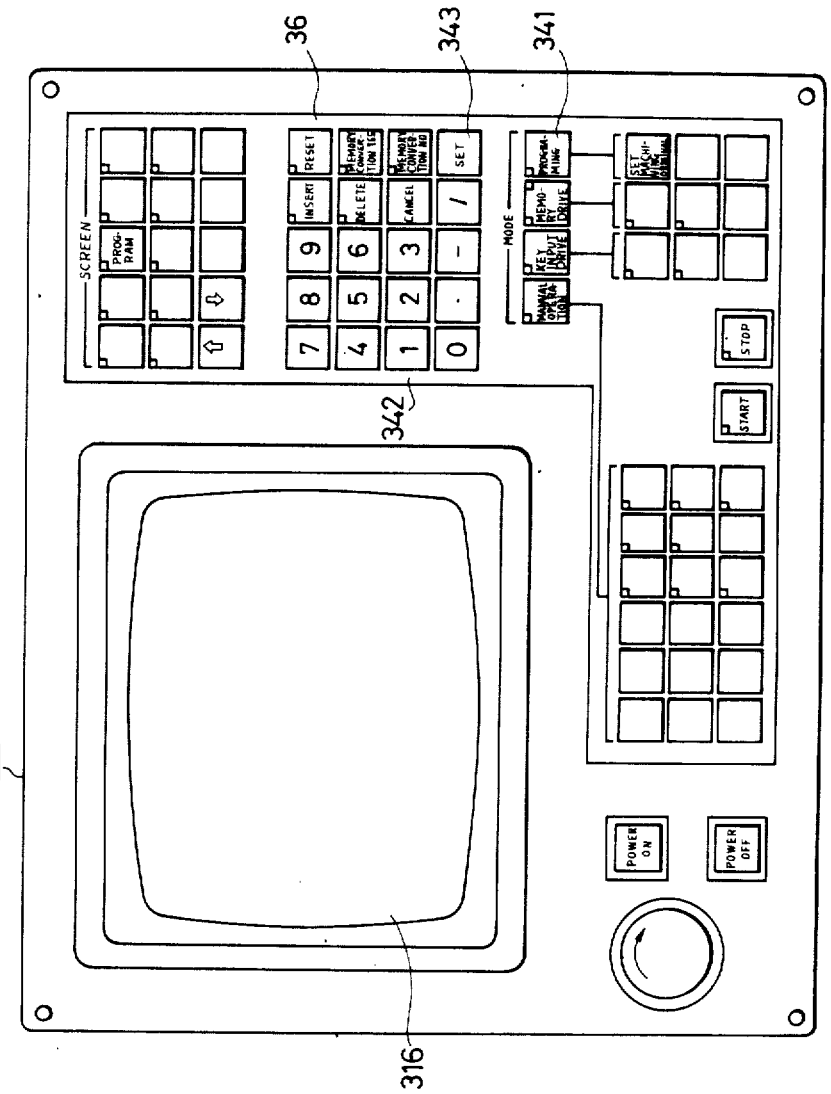
FIG. 12 is a front view of a control terminal for use with the subject invention.

An illustrative front view of computer 32 is illustrated in FIG. 12. As noted above, computer 32 has a keyboard 36. Computer 32 also has a cathode ray (CRT) screen 316. Computer 32 operates to control the display on screen 316. Computer 32 also includes, as is shown in FIG. 12 an editing mode key 341, ten (10) numerical keys 342, and a setting key 343.

Figure 13:
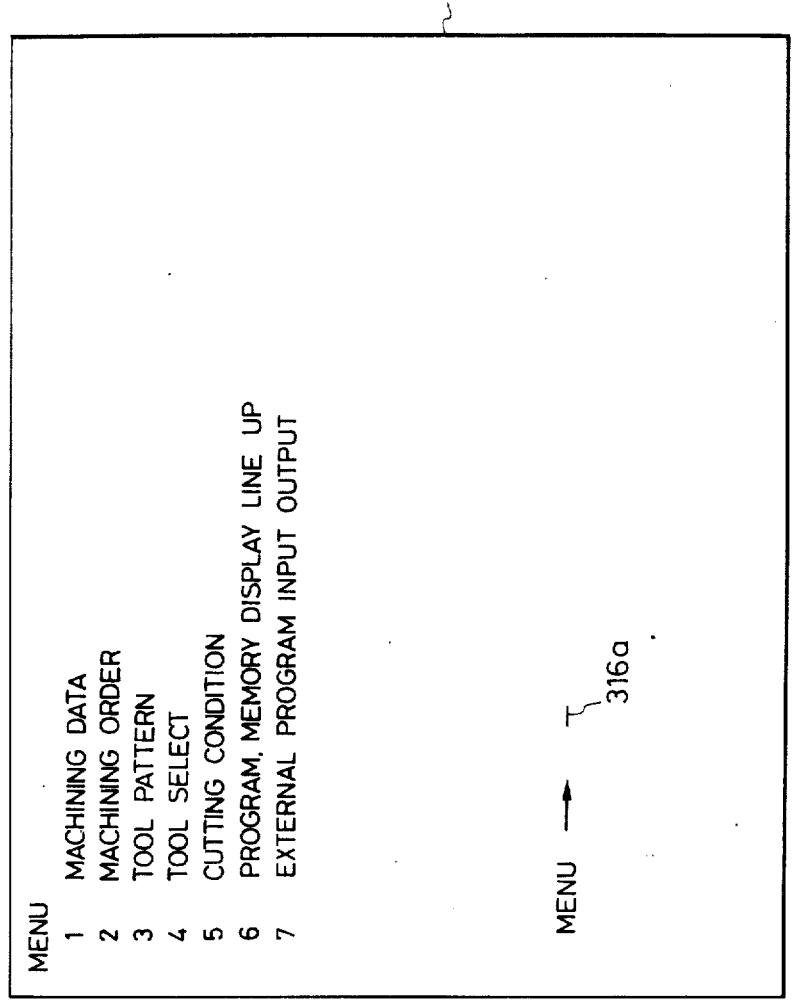
Figure 14:
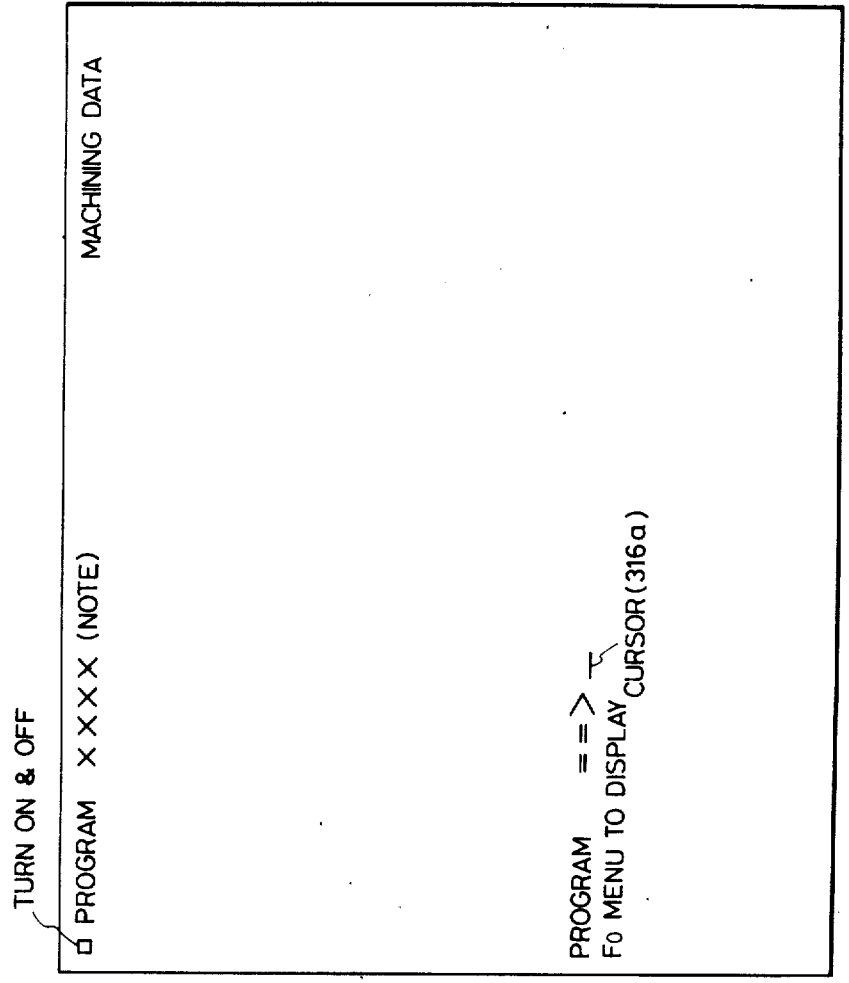
Figure 15:
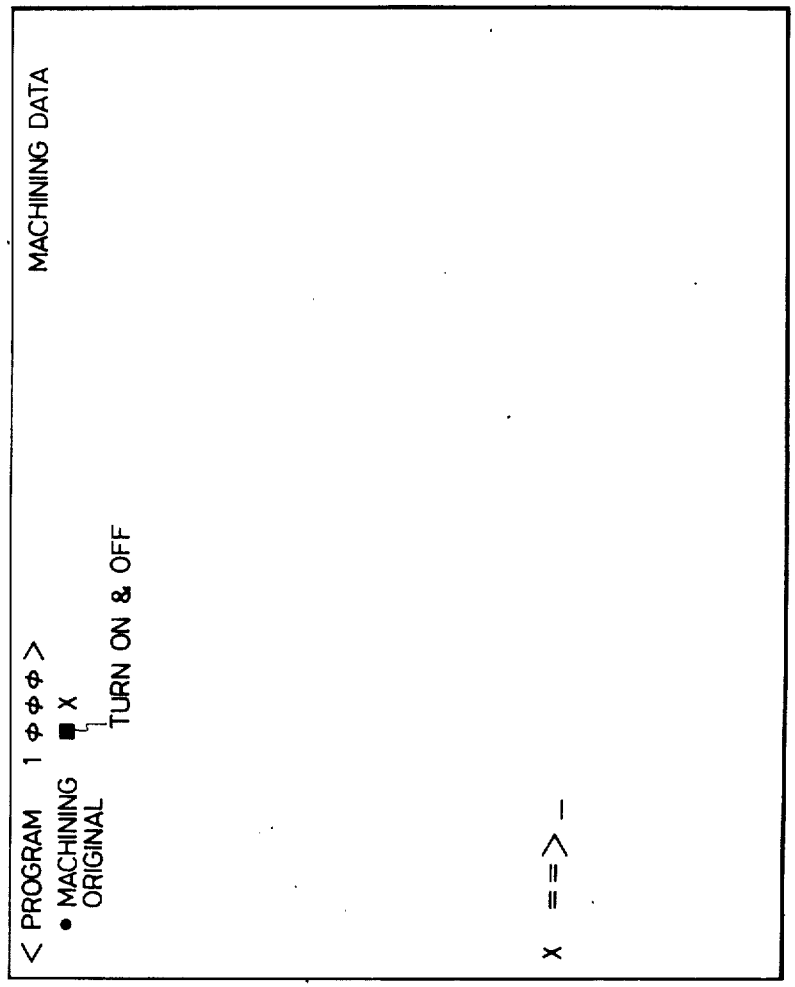
Figure 16:
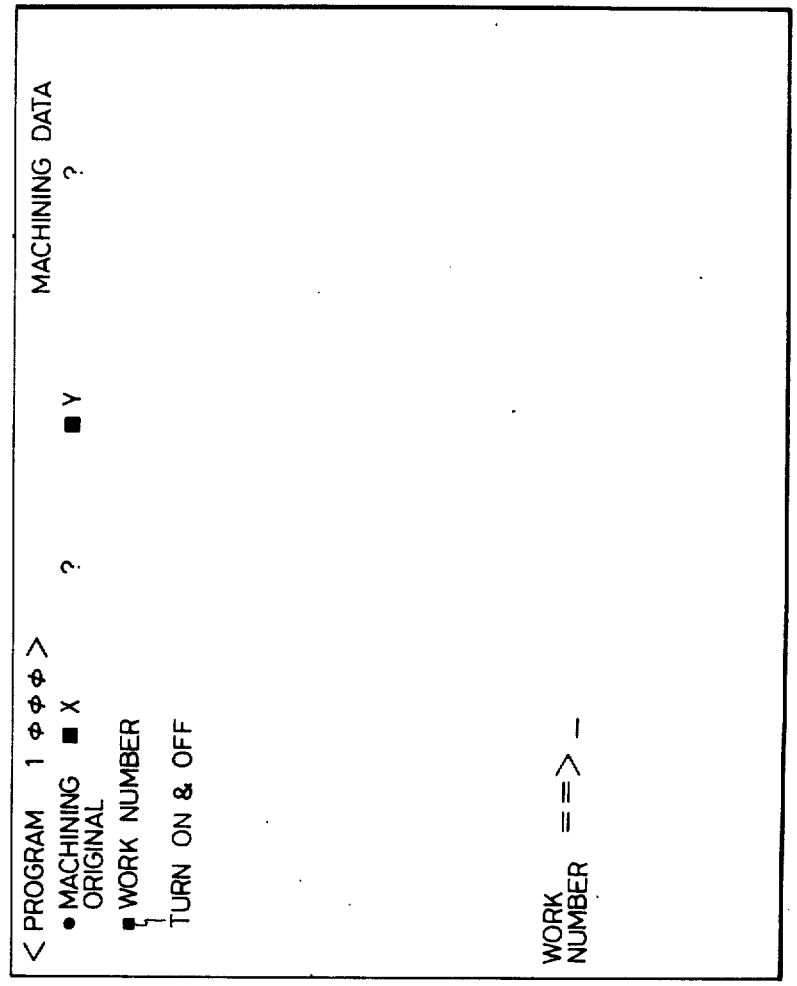

Upon depression of a program editing mode key 341 on keyboard 36, a display as shown in FIG. 13 may appear on screen 316. This display may comprise seven (7) menus as shown in FIG. 13 and the various numbers of each of these menus may flicker. In the case where the entire machining operation is to be carried out as requested by a cursor 316a, a machining data mode of Menu No. 1 should be inputted. Therefore, a number 1 key of the ten (10) keys 342 and a setting key 343 of FIG. 12 are depressed to input the machining data mode. As a result, the display shown in FIG. 14 appears on screen 316, and the cursor 316a requests an indication of a program number. In the case where a program number (i.e. 1000) is selected, this program number is inputted by using the ten (10) keys 342, and the setting key 343. The program number is shifted to the program display area as shown in FIG. 15 and input data identifying the X value origin is required. Therefore, if the X value is known, the X value is inputted. However, if the X value is unknown, setting key 343 is depressed. Next, it is required to provide the Y value origin of the machine operation. Therefore, similarly, the setting key 343 is depressed and, as a result, the picture on screen 316 is changed to the format as shown in FIG. 16. In this condition, the display 316 requires that data indicating the number of workpieces employed be inputted. In the case where the number of workpieces is 1 the digit "1" is inputted by using the ten (10) keys 342, and subsequently depressing the setting key 343. If the number of workpieces is set to more than 1 (allowable up to 4 for example), then a pitch for each of the workpieces is requested.

Thereafter, the display on screen 316 is changed as shown in FIG. 17 and the type of workpiece material employed is required to be entered. If the material is S45c, the number "1" is selected out of the menu indicated in the lower part of the display on screen 316 and is inputted by using the ten (10) keys 342 and the subsequent depression of setting key 343.

As a result, the display on the screen 316 is changed as shown in FIG. 18. The display of FIG. 18 requests the input of the type of machining required in the first operation. Therefore, in the case where a hole is to be drilled in the first operation, the number "2" is inputted and the setting key is subsequently depressed. As a result, the display on screen 316 is changed to the form shown in FIG. 19. In the form shown in FIG. 19 the cursor 316a requests the inputting of the hole diameter. In the case as illustrated above where the hole diameter was 4.0 mm then the value 4.0 mm is inputted by operation of the ten (10) keys 342 and the subsequent depression of setting key 343.

Now the operation of drilling holes 4.0 mm in diameter can be carried out. However, in practice, the following additional data should be inputted:

an indication of the finished surface roughness;

an indication of the machine pattern indicating that the drilling is carried out along a circumference, or along the four sides of a rectangle, or in a straight line and indicating the patterns pitch and angle;

indicating with respect to the verticle axis (Z axis) whether the pattern is a through-hole or a blind hole;

indicating the total machine depth (for example, 85 mm as used in the above illustrative example);

indicating the workpiece height; and indicating the returning height.

After the drilling program has been formed as described above, drilling can be carried out in accordance with the flow diagrams shown in FIGS. 10 and 11.

Dimensions to be inputted are final finished ones. Accordingly, in the case where machining is carried out in an ordinary conventional numerically control (NC) machine tool, it is necessary for the program to obtain data on the position to which the workpiece is to be moved, the speed of movement of the workpiece, tools to be used, speed of the spindle and so on and to express those data in NC language and to input the program to the NC machine tool. Therefore, the NC programmer of such conventional systems must have a knowledge of machining techniques and NC language.

However, in a machine tool according to the subject disclosed embodiment, no NC language is specifically used and the inputting of machining conditions and the like is separated from the program editing operation described above in conjunction with FIGS. 13-19. Therefore, at the time of such programming any person who can read an engineering drawing correctly can undertake the program editing operation. That is, all that is required of the programmer is to successively input the final machining operation and the relevant dimensions in response to the questions displayed on the CRT screen. Therefore, programming by the machine tool operator can be achieved with ease. The order of use of tools, the machining conditions, selection of tools, and the like for the machining operation can be inputted separately as data for the machine tool. Furthermore, the data can be modified for the programs, so that they are stored as parts of the programs.

Additional advantages and modifications will readily occur to those skilled in the art. The invention in its broader aspects is, therefore, not limited to the specific details, representative apparatus, and illustrative examples shown and described. Accordingly, departures may be made from such details without departing from the spirit or scope of applicant's generic inventive concept.

I claim:

1. A machine tool for machining a workpiece by feeding a cutting tool into said workpiece in a series of discrete steps, said machine tool comprising:

(a) data storage means for storing a constant value for each of said steps;

(b) calculating means, responsive to the value of a variable factor independently derived of said constant value and affecting operation of said cutting tool, for calculating for each of said discrete steps an infeed distance as a function of said corresponding constant value for that step said value of said variable factor; and (c) control means for feeding said cutting tool into said workpiece as a function of the infeed distances for a plurality of said and, upon completion of feeding for one step, at least partially withdrawing said cutting tool and subsequently feeding said cutting tool into said workpiece as a function of said infeed distance for the next step.

2. A machine tool of claim 1 wherein said variable factor is cutting tool diameter.

3. A machine tool of claim 2 wherein said infeed distance is a function of both said cutting tool diameter and said corresponding constant value for that step.

4. A machine tool of claim 1 wherein said variable factor is a workpiece material coefficient.

5. The machine tool of claim 4 wherein said infeed distance is a function of said workpiece material coefficient and said corresponding constant value for that step.

6. A machine tool of claim 1 wherein said cutting tool is a drill.

7. A machine tool of claim 1 wherein said cutting tool is a tap.

8. A machine tool for machining a workpiece by feeding a cutting tool into said workpiece in a series of discrete steps, said machine tool comprising:

(a) data storage means for storing a first constant value for each step and a second constant value for each different type of workpiece material;

(b) calculating means for calculating for each of said discrete steps an infeed distance as a function of cutting tool diameter, said first constant value for that step, and said second constant value for the workpiece material; and (c) control means for feeding said cutting tool into said workpiece as a function of said infeed distances for a plurality of steps and, upon completion of feeding for one step, at least partially withdrawing said tool and subsequently feeding said tooling into said workpiece as a function of the infeed distance for the next step.

9. A machine tool of claim 8 wherein said cutting tool is a drill.

10. A machine tool of claim 8 wherein said cutting tool is a tap.

11. A method for machining a workpiece comprising the steps of:

(a) storing a constant value data signal in a memory for each of a plurality of discrete steps during which a cutting tool is to be fed into the workpiece;

(b) calculating an infeed distance for each of said steps as a function of said corresponding constant value for that step and as a function of the value of a variable factor independently derived of said constant value and affecting operation of said cutting tool; and (c) feeding said cutting tool into said workpiece as a function of the infeed distances for a plurality of said steps and, upon completion of feeding for one step, at least partially withdrawing said cutting tool and subsequently feeding said cutting tool into said workpiece as a function of said infeed distance for the next step.

12. A method of claim 11 wherein said variable factor is cutting tool diameter.

13. A method of claim 12 wherein said step of calculating includes multiplying said tool diameter and said corresponding constant value for that step.

14. A method of claim 11 wherein said variable factor is workpiece material coefficient.

15. A method of claim 14 wherein said step of calculating includes multiplying said corresponding constant value for that step and said workpiece material coefficient.

16. A method for machining a workpiece comprising the steps of:

(a) storing a first constant value data signal in a memory for each of a plurality of discrete steps during which a cutting tool is to be fed into the workpiece and storing a second constant value data signal in said memory for each type of workpiece material to be machined;

(b) calculating for each of said discrete steps an infeed distance as a function of said cutting tool diameter, said first constant value for that step, and said second constant value for said workpiece material; and (c) feeding said cutting tool into said workpiece as a function of said infeed distances for a plurality of said steps and, upon completion of feeding for one step, at least partially withdrawing said tool and subsequently feeding said tool into said workpiece as a function of the infeed distance for the next step.

17. A method of claim 16 wherein said step of calculating includes multiplying said tool diameter, said first corresponding value for that step and said second corresponding value for the workpiece material to be machined.

* * * * *

UNITED STATES PATENT AND TRADEMARK OFFICE
CERTIFICATE OF CORRECTION

PATENT NO. : 4,704,689

DATED : November 3, 1987

INVENTOR(S) : Koichi Asakura

It is certified that error appears in the above-identified patent and that said Letters Patent is hereby corrected as shown below:

Claim 1, column 10, line 41, after "step" add --and--, column 10, line 45, after "said" add --steps--.

Signed and Sealed this

Fifth Day of July, 1988

Attest:

DONALD J. QUIGG

Attesting Officer

Commissioner of Patents and Trademarks